United States Patent
Rahman et al.

(10) Patent No.: US 9,300,563 B2
(45) Date of Patent: Mar. 29, 2016

(54) TECHNIQUE FOR EFFICIENTLY AND DYNAMICALLY MAINTAINING BIDIRECTIONAL FORWARDING DETECTION ON A BUNDLE OF LINKS

(71) Applicant: Cisco Technology, Inc., San Jose, CA (US)

(72) Inventors: Reshad A. Rahman, Ottawa (CA); David P. Toscano, Ottawa (CA); Sylvain Masse, Gatineau (CA); David D. Ward, Los Gatos (CA); Neil R. Ketley, Harpenden (GB)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 14/028,026

(22) Filed: Sep. 16, 2013

(65) Prior Publication Data

US 2014/0019614 A1  Jan. 16, 2014

Related U.S. Application Data

(63) Continuation of application No. 11/366,732, filed on Mar. 2, 2006, now Pat. No. 8,543,718.

(51) Int. Cl.
  *G06F 15/16* (2006.01)
  *G06F 15/173* (2006.01)
  (Continued)

(52) U.S. Cl.
  CPC ............... *H04L 43/10* (2013.01); *H04L 45/00* (2013.01); *H04L 45/22* (2013.01); *H04L 45/24* (2013.01); *H04L 45/245* (2013.01); *H04L 45/28* (2013.01); *H04L 45/58* (2013.01); *H04L 45/60* (2013.01); *H04L 41/0663* (2013.01); *H04Q 2011/0081* (2013.01); *H04Q 2213/13162* (2013.01); *Y02B 60/33* (2013.01)

(58) Field of Classification Search
  CPC ......... H04L 45/28; H04L 45/22; H04L 43/10; H04L 45/24; H04L 41/0663; H04Q 2011/0081; H04Q 2213/13162
  USPC .......................................... 709/230, 238, 249
  See application file for complete search history.

(56) References Cited

U.S. PATENT DOCUMENTS 6,678,241 B1   1/2004 Gai et al.
6,804,712 B1  10/2004 Kracht
(Continued)

OTHER PUBLICATIONS

Rehkter et al, "A Border Gateway Protocol (BGP-4)", Mar. 1995, p. 1-58, Network Working Group, RFC 1771.*

(Continued)

*Primary Examiner* — Taylor Elfervig
(74) *Attorney, Agent, or Firm* — Novak Druce Connolly Bove + Quigg LLP

(57) ABSTRACT

In one embodiment, a plurality of links between a network node and another network node are configured as a link bundle. The network node establishes one or more standby bidirectional forwarding detection (BFD) sessions. Each standby BFD session is associated with one or more links of the link bundle. The network node establishes an active BFD session. The active BFD session is associated with one or more links of the link bundle. In response to non-receipt of returned BFD messages for the active BFD session, one or more new active BFD sessions are selected from the one or more standby BFD sessions. In response to non-receipt of returned BFD messages for the one or more new active BFD sessions, it is determined that the link bundle has failed.

19 Claims, 8 Drawing Sheets

(51) Int. Cl.
  *H04L 12/26*   (2006.01)
  *H04L 12/701*  (2013.01)
  *H04L 12/707*  (2013.01)
  *H04L 12/709*  (2013.01)
  *H04L 12/703*  (2013.01)
  *H04L 12/775*  (2013.01)
  *H04L 12/773*  (2013.01)
  *H04Q 11/00*   (2006.01)
  *H04L 12/24*   (2006.01)

(56) References Cited

U.S. PATENT DOCUMENTS

| | | | |
|---|---|---|---|
| 6,856,600 B1 | 2/2005 | Russel et al. | |
| 6,950,865 B1 | 9/2005 | Depaolantonio | |
| 6,963,575 B1* | 11/2005 | Sistanizadeh et al. | 370/404 |
| 6,978,394 B1 | 12/2005 | Charny et al. | |
| 7,428,209 B1 | 9/2008 | Roberts | |
| 2004/0090913 A1 | 5/2004 | Scudder et al. | |
| 2005/0083928 A1 | 4/2005 | Sivabalan et al. | |
| 2005/0097219 A1 | 5/2005 | Goguen et al. | |
| 2006/0209685 A1 | 9/2006 | Rahman et al. | |
| 2006/0291378 A1* | 12/2006 | Brotherston et al. | 370/221 |

OTHER PUBLICATIONS

Katz et al.. "Bidirectional Forwarding Detection", Feb. 2005, p. 1-44, Network Working Group, Internet Draft (draft-ietf-bfd-base-01.txt).*

FiberOptic, "SONET—Synchronous Optical Networking / SDH—Synchronous Digital Heirarchy", Internet—www.fiberoptic.com/adt_sonet_sdh.html, p. 1-4.*

Chen Yinghui; Qi Yuxian; Zhang Junfeng; Meng Luoming, "Connectivity management of network management interface," in Communication Technology Proceedings, 2003. ICCT 2003. International Conference on , vol. 2, No., pp. 1580-1584 vol. 2, Apr. 9-11, 2003.*

Tacca, M.; Kai Wu; Fumagalli, A.; Vasseur, J.-P., "Local Detection and Recovery from Multi-Failure Patterns in MPLS-TE Networks," in Communications, 2006. ICC '06. IEEE International Conference on , vol. 2, No., pp. 658-663, Jun. 2006.*

Aboba, "Architectural Implications of Link Indications", Jul. 2005, Network Working Group Internet Draft, http://www.potaroo.netlieU/all-ids/draft-iab-link-indications.02.txt, p. 1-49.

Aggarwal et al., "BFD for MPLS LSPs", Apr. 2004, Internet: ietf.org, p. 1-9.

Aggarwal, "OAM mechanisms in MPLS Layer 2 transport Networks", Communications Magazine, IEEE, vol. 42, Issue:10, Oct. 2004, p. 124-130.

Katz et al., "Bidirectional Forwarding Detection—draft-ietf-bfd-base-01.txt", Feb. 2005, IETF, p. 1-44.

Katz et al., "Bidirectional Forwarding Detection", Oct. 2005, Internet: ietf.org, p. 1-42.

Katz, D., et al., "Generic Application of BFD," draft-ietf-bfd-generic-01.txt, Oct. 2005, pp. 1-9.

Katz, D. and Ward, D., Internet Draft entitled Bidirectional Forwarding Detection (draft-ietf-bfd-base-04.txt), pp. 1-42, Oct. 2005.

"PCT Notification of Transmittal of the International Search Report and the Written Opinion of the International Searching Authority, or the Declaration," International Application No. PCT/US07/03075, International Filing Date Feb. 6, 2007, Date of Mailing: Oct. 26, 2007, 8 pages.

"PCT Notification of Transmittal of the International Search Report and the Written Opinion of the International Searching Authority, or the Declaration," International Application No. PCT/US07/03075, International Filing Date Feb. 6, 2007, Date of Mailing: Nov. 16, 2007, 8 pages.

Perlman, Radia, Interconnections Second Edition: Bridges, Routers, Switches, and Internetworking Protocols, Sections 12.1-12.3 pp. 299-324, Addison Wesley longman, Inc. 2000.

Rekhter et al., "RFC 1771—A Border Gateway Protocol 4 (BGP-4 )", Mar. 1995, Network Working Group, p. 1-58.

Sklower K., et al., RFC 1990 entitled, The PPP Multilink Protocol (MP), Aug. 1996, 23 pgs.

"Supplementary European Search Report," European Application No. 07749977.0 / 1989835, PCT/US2007003075, Applicant: Cisco Technology, Inc., Date of Mailing: Mar. 15, 2011, pp. 1-8.

Tanenbaum, Andrew S., Section 1.4.2 The TCP/IP Reference Model, Computer Networks: Fourth Edition, pp. 41-44, Pearson Education, Inc., 2003.

Zhai et al., "BFD initialization with BGP and static routes", Dec. 2005, IETF, p. 1-6.

* cited by examiner

TECHNIQUE FOR EFFICIENTLY AND DYNAMICALLY MAINTAINING BIDIRECTIONAL FORWARDING DETECTION ON A BUNDLE OF LINKS

RELATED APPLICATIONS

The present application is a continuation of U.S. patent application Ser. No. 11/366,732 by Rashad A. Rahman, titled "A Technique for Efficiently and Dynamically Maintaining Bidirectional Forwarding Detection on a Bundle of Links", filed on Mar. 2, 2006, the contents of which are incorporated by reference herein.

BACKGROUND OF THE INVENTION

1. Field of the Invention

The present invention relates to computer networks and more particularly to maintaining bidirectional forwarding detection (BFD) on a bundle of links in a computer network.

2. Background Information

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein. A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes within a routing domain are typically configured to forward data using predetermined paths from "interior gateway" routing protocols, such as conventional link-state protocols and distance-vector protocols. These interior gateway protocols (IGPs) define the manner with which routing information and network-topology information are exchanged and processed in the routing domain. The routing information exchanged (e.g., by IGP messages) typically includes destination address prefixes, i.e., the portions of destination addresses used by the routing protocol to render routing ("next hop") decisions. Examples of such destination addresses include IP version 4 (IPv4) and version 6 (IPv6) addresses. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. BGP is well known and generally described in Request for Comments (RFC) 1771, entitled *A Border Gateway Protocol 4* (BGP-4), by Y. Rekhter et al., published March 1995, which is publicly available through the Internet Engineering Task Force (IETF) and is hereby incorporated by reference in its entirety. BGP generally operates over a reliable transport protocol, such as TCP, to establish a TCP connection/BGP session. BGP also may be extended for compatibility with services other than standard Internet connectivity. For instance, Multi-Protocol BGP (MP-BGP) supports various address family identifier (AFI) fields that permit BGP messages to transport multi-protocol information.

A network node within a routing domain may detect a change in the domain's topology. For example, the node may become unable to communicate with one of its neighboring nodes, e.g., due to a link failure between the nodes or the neighboring node failing, such as going "off line," etc. If the detected node or link failure occurred within the routing domain, the detecting node may advertise the intra-domain topology change to other nodes in the domain using IGP messages. Similarly, if an edge device detects a node or link failure that prevents communications with a neighboring routing domain, the edge device may disseminate the inter-domain topology change to other edge devices within its routing domain (e.g., using BGP messages). In either case, propagation of the network-topology change occurs within the routing domain and nodes in the domain thus converge on a consistent view of the new network topology, i.e., without the failed node or link.

As those skilled in the art will understand, it is desirable to quickly detect the failure of a node or link so that minimal traffic is lost. Conventionally, since a BGP session is often employed between the two inter-domain devices, BGP KEEPALIVE messages may be used to determine whether the peers are reachable (e.g., for link or node failure). For instance, BGP may specify a Hold Time interval, the expiration of which indicating that an error has occurred within the BGP session (e.g., at least three seconds). Each BGP message received at a device resets the Hold Time. A BGP KEE- PALIVE message may be exchanged between the devices of the BGP session to reset the Hold Time. As such, the interval between exchanged KEEPALIVE messages must be often enough as not to cause the Hold Timer to expire. Conventionally, a reasonable maximum time between KEEPALIVE messages would be one third of the Hold Time interval. However, according to the BGP standard set forth in RFC 1771, the KEEPALIVE messages must not be sent more frequently than one per second, e.g., in order to minimize traffic between the BGP devices. Notably, in the event the Hold Time has expired, the devices may "break" (i.e., tear down or close) the BGP session. Similarly, as those skilled in the art will understand, IGP nodes within a network may exchange IGP HELLO messages to determine whether internal peers (intra-domain nodes) are reachable.

Because of the increasing need for faster network response time and convergence, administrators often require the ability of individual network devices to quickly detect failures. Bidirectional Forwarding Detection (BFD) provides rapid failure detection times between devices, while maintaining low overhead. For instance, BFD failure detection may be as fast as 50 milliseconds (ms), while the BGP (and IGP) method described above is on the order of seconds (e.g., three seconds). BFD verifies connectivity between two devices based on the rapid transmission of BFD control packets between the two devices (e.g., little to no BFD holdtime, as will be understood by those skilled in the art). Notably, BFD also provides a single, standardized method of link/device/protocol failure detection at any protocol layer and over any media. A secondary benefit of BFD, in addition to fast failure detection, is that it provides network administrators with a consistent method of detecting failures. Thus, one availability methodology could be used, regardless of the protocol (e.g., IGP, BGP, etc.) or the topology of the network. BFD is further described in Katz, et al. *Bidirectional Forwarding Detection<draft-ietf-bfd-base-04.txt>*, Internet Draft, October, 2005, the contents of which are hereby incorporated by reference as though fully set forth herein. Generally, BFD sessions may be established between network nodes (e.g., routers) in order to monitor connectivity of the nodes over a particular link between the nodes.

Often, users organize links as a group or "bundle" for a variety of reasons known to those skilled in the art. For example, link groups may be used for redundancy, load balancing, and/or increasing the available bandwidth between two points in the network, e.g., by combining multiple smaller/slower links into a single group of links that produces a greater bandwidth value than the smaller/slower links individually. Various forms of link bundles include link bonding/aggregation, EtherChannel, and multilink point-to-point protocol (PPP), which is described in RFC 1990, entitled *The PPP Multilink Protocol (MP)*, published August 1996, etc. Other examples of link bundles will be understood by those skilled in the art, and those mentioned herein are merely examples. For instance, links of VLANs (Virtual LANs, or a group of network devices/elements on different physical LAN segments operating as though they were on the same physical LAN segment) may also be bundled.

Just as BFD may be used to very rapidly determine connectivity between two nodes, it may also be desirable to rapidly determine the maintained operation (i.e., connectivity) of a link bundle between two nodes (or more, as will be understood by those skilled in the art). A BFD session on a link bundle should remain active while the bundle is active, i.e., still able to transmit traffic. In other words, so long as one or more (configurable) links of the bundle ("bundle links") are operational, the bundle, and hence the BFD session, should remain active. Accordingly, none of the following events should cause the BFD session on the bundle to fail if other links of the bundle are still operational: failure of a bundle link; online insertion and removal (OIR) of a line card (LC) that hosts one or more bundle links; addition of a link to the bundle; removal of a bundle link; shutdown of a bundle link; failure of a centralized route processor (RP) or control card of a node (RP failover); etc.

One solution that offers BFD for link bundles is a centralized BFD session, such as an RP-based BFD session. In a centralized BFD session, the RP (or control card) monitors the status of the BFD session and each of the bundle links. BFD messages may be sent on each bundle link so that while at least one bundle link is operational, so is the bundle, and consequently so is the centralized BFD session. In many situations, however, the large number of BFD messages sent between the nodes may violate various BFD parameters, such as, e.g., maximum packet transmissions or time between packets as agreed upon during BFD session initialization (negotiation). Also, two nodes at either end of a link bundle, e.g., routers (layer 3), may be separated by one or more intermediate switches (layer 2). The one or more switches may receive a plurality of BFD messages from one router, but based on routing/forwarding decisions at the switch (e.g., layer 2 hashing algorithms), the switch may only continue the transmission of BFD messages over a single bundle link, leaving the other bundle links unmonitored. Furthermore, the two routers may be connected to the switch by a different number of links (e.g., a link bundle from each router terminates at the switch), so a one-to-one mapping of BFD messages on individual links is not possible.

Alternatively, to address some of the limitations of sending BFD messages over all bundle links, the centralized BFD session may instead send and receive BFD messages over a single link. While the BFD messages are received by that single link, the link bundle is still operational. When BFD messages are no longer received on that link, the centralized BFD session must select a different link of the bundle to send and receive BFD messages.

A major disadvantage to operating a centralized BFD session for link bundles is that if the RP (control card) fails, the centralized BFD session also fails, resulting in a false indication of link bundle failure where at least one LC hosting the link bundle is still operational. Clearly, for many applications, the centralized BFD session approach is unreliable. Further disadvantages include poor scalability for multiple link bundles, and decreased performance. For instance, the RP is often tasked with many different operations of the node, such as updating routing tables, generating advertisement messages, etc., as will be understood by those skilled in the art. As such, the time dedicated to the BFD session may be less than necessary to maintain the high-demand reaction time of the BFD protocol (i.e., sub-second failure detection). To compensate for the centralized BFD session's potentially slower reaction time (e.g., for selecting new links during single-link BFD sessions), it may be necessary to use longer timeout values (hold timers) to allow the RP to adjust to changes in the network. There remains a need, therefore, for a technique that efficiently maintains BFD on a bundle of links to address the problems mentioned above.

SUMMARY OF THE INVENTION

The present invention is directed to a technique for efficiently and dynamically maintaining bidirectional forwarding detection (BFD) on a bundle of links in a computer network. According to the novel technique, one or more "standby" BFD sessions may be established on one or more corresponding line cards (LCs), the LCs having one or more links of the bundle (bundle links). Once established, one of the standby BFD sessions may be selected as an "active" BFD session based on activity of one of the bundle links of the corresponding LC. For example, the active BFD session may be selected in response receiving a BFD message on a bundle link of the corresponding LC. Also, BFD messages may be transmitted from one of the bundle links of the active BFD session, e.g., the link receiving BFD messages. In response to inactivity of the transmitting link (e.g., failure, removal, etc.), the active BFD session may switch to another available active bundle link, and if no other active bundle links are available to the active BFD session, one of the standby BFD sessions is selected as the new active BFD session. In the event no other standby BFD sessions exist, the link bundle is determined to have failed.

Advantageously, the novel technique efficiently and dynamically maintains BFD on a bundle of links in a computer network. By alternating between one or more standby BFD sessions on corresponding LCs as the active BFD session for a bundle of links, the novel technique provides greater performance, scalability, and reliability over a centralized BFD session. For instance, the BFD sessions on LCs may continue to operate regardless of a failure of a centralized process (e.g., a route processor, RP) managing the LCs. Also, by maintaining standby BFD sessions, more rapid handling of link and/or LC failure is possible, thus more aggressive BFD timeouts may be used. Further, the dynamic nature of the novel technique (e.g., selecting the active BFD session) alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN
ILLUSTRATIVE EMBODIMENT

Figure 1:
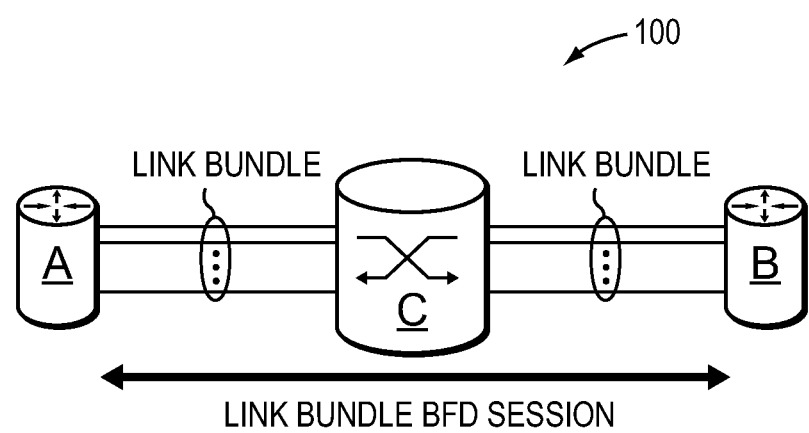
FIG. 1 is a schematic block diagram of an exemplary computer network that may be advantageously used with the present invention.

FIG. 1 is a schematic block diagram of an exemplary computer network 100 comprising a plurality of nodes A-C, such as routers, switches, or other network devices, interconnected as shown. For instance, node A may be connected to node C via a plurality of links arranged as a first bundle interface (link bundle), and node B may be connected to node C via a plurality of links arranged as a second link bundle. Illustratively, nodes A and B may be embodied as routers (layer 3), while node C may be embodied as a switch (layer 2). As such, the link bundles may appear to each of the routers A and B as a single link bundle (layer 3) from A to B, as will be understood by those skilled in the art. The nodes may be a part of one or more autonomous systems, routing domains, or other networks or subnetworks. These examples are merely representative. Those skilled in the art will understand that any number of routers, switches, nodes, links, etc. may be used in the computer network 100 and connected in a variety of ways, and that the view shown herein is for simplicity. For example, the nodes may be configured with connections embodied as virtual local area networks (VLANs), as will be understood by those skilled in the art.

Data packets may be communicated by the nodes A-C using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a particular network may rely on predetermined "interior" gateway protocols (IGPs), such as conventional link-state or distance-vector protocols. In addition, data packets containing network topology information may be exchanged among networks using "external" gateway protocols, such as the Border Gateway Protocol (BGP). Those skilled in the art will understand that other communication protocols may be used within and among the networks, and that those mentioned above are merely representative.

Figure 2:
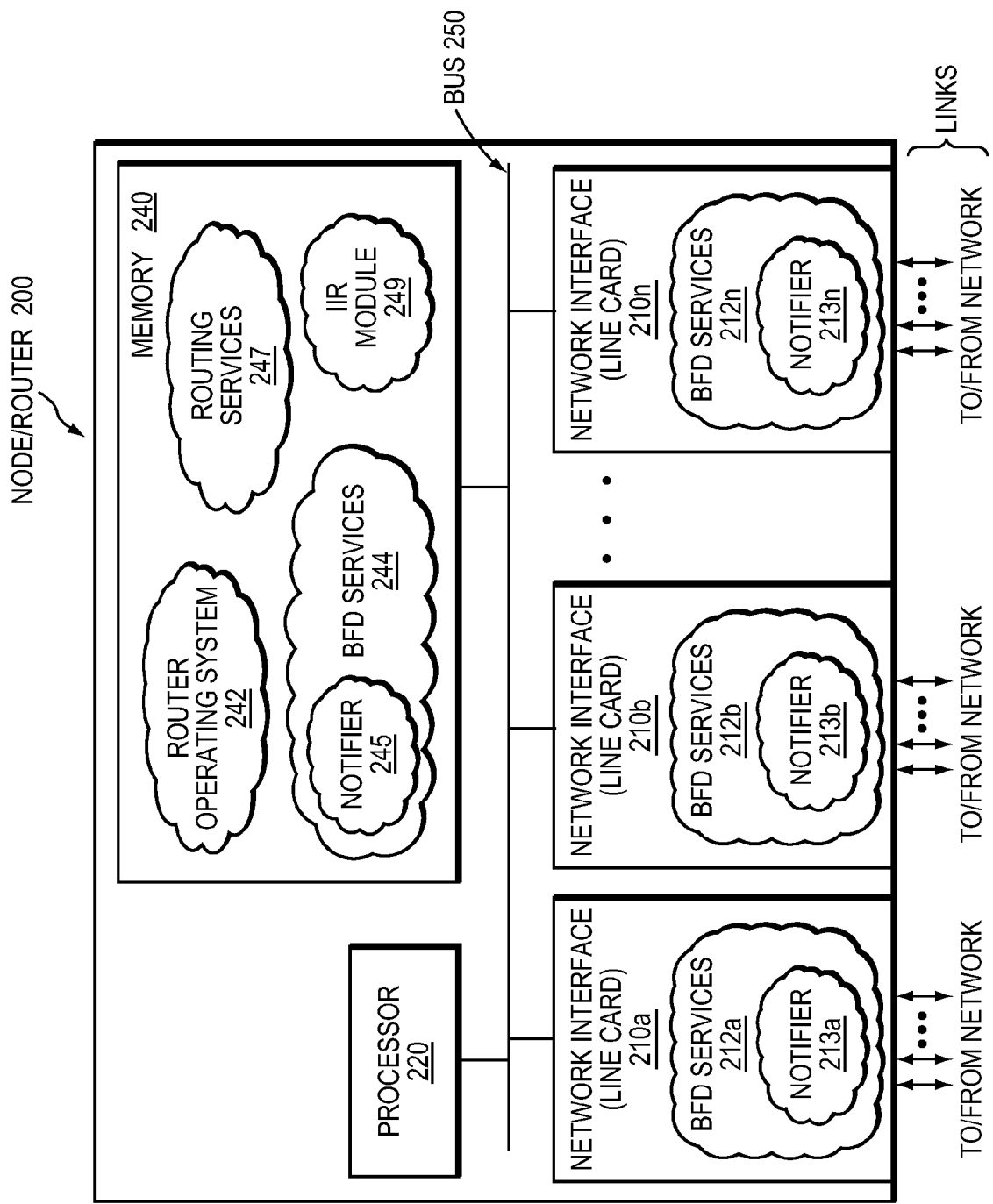
FIG. 2 is a schematic block diagram of an exemplary node that may be advantageously used with the present invention.

FIG. 2 is a schematic block diagram of an exemplary node 200 that may be advantageously used with the present invention, such as a router. The node comprises a plurality of network interfaces 210 (e.g., line cards, LCs), a processor 220, and a memory 240 interconnected by a system bus 250. The network interfaces 210 contain the mechanical, electrical and signaling circuitry for communicating data over one or more physical links coupled to the network 100. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor 220 (e.g., a route processor, RP) and the network interfaces 210 for storing software programs and data structures associated with the present invention. The processor 220 may comprise necessary elements or logic adapted to execute the software programs and manipulate the data structures, such as routing tables or virtual routing tables (not shown). A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may comprise routing services 247, bidirectional forwarding detection (BFD) services 244 (e.g., a centralized BFD service), and Inter-Interface Relationships (IIR) module 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, BGP, etc. These functions may be configured to manage a forwarding information database (not shown) containing, e.g., data used to make forwarding decisions. Routing services 247 may also perform functions related to virtual routing protocols, such as maintaining virtual routing/forwarding (VRF) instances (not shown), etc., as will be understood by those skilled in the art.

IIR module 249 (or a "bundle membership service") contains computer executable instructions executed by processor 220 to exchange and interpret information regarding bundles for which the node 200 hosts one or more bundle links. For instance, routers A and B may exchange IIR notifications to respectively inform each other of bundle-related events, such as link creation, link deletion, and state change (e.g., active, inactive) of a link within the bundle (i.e. link integrity control messages). The nodes hosting one or more bundle links may synchronize their information by exchanging notifications (similar to IGP and/or BGP notifications) that may comprise, e.g., interface handles, interface states, interface types, member bandwidths, member identifiers (IDs), etc., as will be understood by those skilled in the art. Those skilled in the art will also understand that the use of an IIR module herein is merely representative, and that other means known to those skilled in the art to obtain link bundle information may be used in accordance with the present invention.

BFD services (or process) 244 contain computer executable instructions executed by processor 220 to verify connectivity between two systems/devices, depending on the transmission of BFD control packets ("BFD messages") between the two devices. Assume, for example, that router A wishes to verify its connectivity to router B (i.e., through switch C) using BFD. Router A may transmit a BFD message to router B, and router A verifies connectivity based on a response/non-response from router B, e.g., within a particular time period. If router A does not receive a response from router B within the time period, router A determines that the BFD session has failed or "timed out" (or is "down"), accordingly. (Notably, a more detailed description of this process for link bundles in accordance with the present invention is provided below.)

Figure 3:
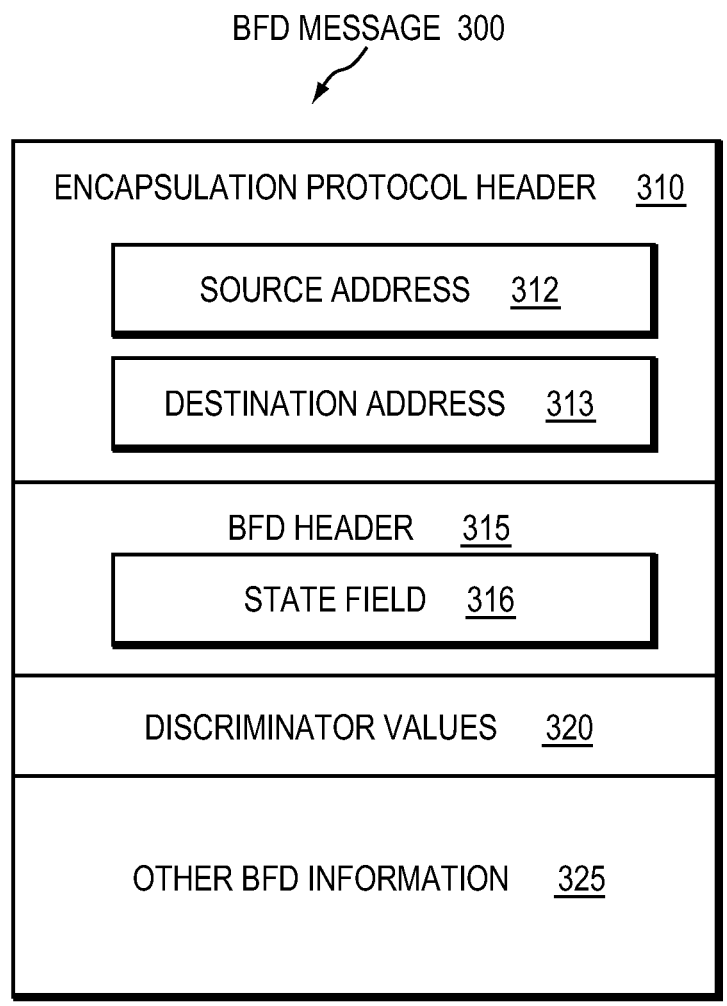
FIG. 3 is a schematic block diagram of an exemplary BFD message that may be used in accordance with the present invention.

FIG. 3 illustrates an exemplary BFD message 300 that may be transmitted by BFD nodes/routers 200. Illustratively, the BFD message 300 is a generic BFD message, and those skilled in the art will understand that other BFD messages may comprise other fields accordingly. The message 300 includes an encapsulation protocol header 310, an optional BFD header field 315, a discriminator values (e.g., a "My Discriminator" and/or "Your Discriminator) field 320, and a field for other BFD information 325. As those skilled in the art will understand, BFD messages 300 are sent in an encapsulation appropriate to the environment (e.g., TCP/IP, MPLS, etc.). Thus, the encapsulation protocol header 310 contains information standard for the specific type of encapsulation. A source address 312 and destination address 313 within the header may be network addresses for the sending device and receiving device, respectively.

The BFD header field 315 may comprise standard BFD header information, such as, e.g., a BFD version number, a message length, certain flags, etc., or other information (more or less) as configured by the sending device. For example, a state field 316 may be included within the header 315 that indicates a state of the BFD session at the sending node (e.g., UP, DOWN, INIT, or ADMINDOWN, maintained by a BFD state machine of BFD services 244), which may then be used by the receiving node to update its BFD session state accordingly. Because a sending device may have more than one BFD session established at a time (e.g., with the same receiving device, or other receiving devices), the discriminator fields 320 contain sufficient information to demultiplex the BFD messages 300 to the correct BFD session once it has been received by the receiving device. An example discriminator may be an opaque value that identifies each BFD session, and which is unique among all BFD sessions at each device. For instance, a "My Discriminator" value must be unique at the sending device, while a "Your Discriminator" value must be unique at the receiving device. Also, the other BFD information field 325 may be used according to the BFD protocol, such as, e.g., timer interval values, authentication, etc. Notably, BFD may operate across any number of links and at any protocol layer, e.g., Physical, Data Link, Network, Virtual, etc., as will be understood by those skilled in the art. As mentioned above, the BFD protocol is further described in the above-incorporated Internet Draft entitled *Bidirectional Forwarding Detection<draft-ietf-bfd-base-04.txt>*.

The present invention is directed to a technique for efficiently and dynamically maintaining BFD on a bundle of links in a computer network. According to the novel technique, one or more "standby" BFD sessions may be established on one or more corresponding LCs, the LCs having one or more links of the bundle (bundle links). Once established, one of the standby BFD sessions may be selected as an "active" BFD session based on activity of one of the bundle links of the corresponding LC. For example, the active BFD session may be selected in response receiving a BFD message on a bundle link of the corresponding LC. Also, BFD messages may be transmitted from one of the bundle links of the active BFD session, e.g., the link receiving BFD messages. In response to inactivity of the transmitting link (e.g., failure, removal, etc.), the active BFD session may switch to another available active bundle link, and if no other active bundle links are available to the active BFD session, one of the standby BFD sessions is selected as the new active BFD session. In the event no other standby BFD sessions exist, the link bundle is determined to have failed.

In accordance with the present invention, BFD services 244, e.g., a "master" BFD process executing on the RP 220 of a node 200, initiates a link bundle BFD session by creating one or more "agent" BFD sessions executing on BFD services 212*a-n* of each LC 210*a-n* hosting a link of the bundle. For example, router A of FIG. 1 may wish to monitor connectivity to router B (e.g., either over a link bundle or a bundle VLAN). As such, each LC 210 of router A hosting a link of the bundle connected to router B (e.g., through switch C, as will be understood by those skilled in the art) establishes an agent BFD session. Once the agent BFD sessions are established, BFD responsibilities may be given to those sessions, such that the agent BFD sessions are completely (100%) autonomous from the master BFD session. Accordingly, in the event the RP (or control card) fails, is changed, restarted, etc., (i.e., master BFD services 244 is brought "off-line"), the link bundle BFD session remains operational on the BFD services 212 of LCs 210.

Also in accordance with the present invention, a new state, "STANDBY," is added to the states (i.e., UP, DOWN, INIT, and ADMINDOWN) of the BFD protocol. The novel STANDBY state is an internal state of the BFD state machine of the BFD sessions 212*a-n*, i.e., the state is not signaled to receiving nodes of the BFD session (e.g., in state field 316 of BFD messages 300). During the establishment of the agent BFD sessions, each agent BFD session is placed in the STANDBY state, i.e., is established as a standby BFD session.

Once established, each of the standby BFD sessions determines whether it should be designated as the active BFD session according to an algorithm used by all of the standby BFD sessions. By using the same algorithm, it can be substantially assured that only one standby BFD session will determine that it is the active BFD session. For example, a simple algorithm may consist of selecting the BFD session on an LC having a lowest identifier value (e.g., "1"). Other algorithms may be used to initially select the active BFD session in accordance with the present invention, as will be understood by those skilled in the art. Also, the initial selection algorithm may be a slower algorithm than typically necessary in the high-speed demand of BFD since the BFD session (and the transmission of BFD messages) has yet to be activated (i.e., to be "UP"). Upon determining that it should be the active BFD session, the designated active BFD session may notify the remaining standby BFD sessions of its active status, thus preventing any disagreements (notably, e.g., as a worst case with a "race condition" as will be understood by those skilled in the art). Communication among the active and standby BFD sessions, e.g., the active status notification above, may be performed by "Notifier" processes 213*a-n* of the active and standby BFD sessions. (The master BFD session 244 may also have a Notifier process 245 to communicate with the agent (active and/or standby) BFD sessions.) Notably, in the event a new link is added to the link bundle on a new LC, the new LC establishes a standby BFD session accordingly.

Upon selecting the active BFD session (e.g., on LC 210 of router A), the active BFD session may transmit BFD messages 300 to the receiving node (e.g., router B) in accordance with the BFD protocol. In the event the active BFD session hosts more than one bundle link, a single link is selected as the transmitting link. Those skilled in the art will understand that active (distributing) bundle links may be used with the BFD sessions, unless, however, there are no active links, in which case the BFD sessions may be configured to use inactive (collecting) links (e.g., for a short period of time until an active link becomes available, as will be further understood by those skilled in the art). As mentioned above, the state field 316 of the BFD message 300 only contains one of either UP, DOWN, INIT, and ADMINDOWN states. Notably, the state of the active BFD session may be shared with (e.g., by Notifier processes 213) with the standby BFD sessions.

Due to the characteristics of link bundles as will be understood by those skilled in the art (e.g., especially two link bundles on either side of a layer 2 switch between two nodes, as in FIG. 1), an asymmetric path may result during the transmission of the BFD messages. In other words, the active BFD session of a node may have selected a transmitting link to send the BFD messages, but the node may receive returned BFD messages on another link, possibly on another LC. In response to this, the present invention may either "punt" (forward) the received BFD messages from the receiving LC to the active (transmitting) LC, or switch the active BFD session to the standby BFD session of the receiving LC.

To punt the received BFD message, the receiving BFD session may quickly forward the received BFD messages to the active BFD session for processing. A more optimal approach may be to punt received BFD messages during initial establishment of the link bundle BFD session, but then to only send notification from the receiving standby BFD sessions when a BFD event occurs. For instance, once a standby BFD session begins receiving BFD messages, it may notify the active BFD session (e.g., through Notifier processes 213) that it is receiving BFD messages. Subsequently, the receiving standby BFD session may only send further notifications to the active BFD session if the received BFD messages stop arriving (i.e., the BFD session times-out).

Alternatively, the standby BFD session receiving the returned BFD messages may select itself as the active BFD session, which may then begin transmitting BFD messages over the same link upon which the returned messages were received. By doing this, the originally asymmetric path may become a symmetric path (at least as seen by the node), transmitting and receiving BFD messages on the same bundle link. Also, by maintaining a single active BFD session (for both transmitting and receiving), multiple LCs are not required to share information and resources with other LCs. The new active BFD session may notify the other BFD sessions (i.e., standby BFD sessions and the previously active BFD session) that it has assumed the role of the active BFD session. Also, when a standby BFD session assumes the role as the active BFD session, the previously active BFD session may be configured to continue transmitting BFD messages on the previous bundle link until the new link of the new active BFD session is confirmed as transmitting messages (e.g., learned through a notification from Notifier process 213). This helps prevent against false failure notification of the link bundle due to any latency involved with switching to a new active BFD session. Further, upon receiving notification that a new active BFD session has been selected, the previously active BFD session enters the STANDBY state, thus becoming a standby BFD session.

Notably, when switching the active BFD session based on received BFD messages, the peer BFD node (i.e., the node sending the received BFD messages) may change links frequently, e.g., due to a problem or other reason generally unknown to the receiving BFD node. If this happens, the receiving BFD node may regularly re-host the BFD session to a new active BFD session, which is undesirable. Furthermore, should both BFD nodes oscillate in this manner, the BFD session may never synchronize and may never be functional (i.e., UP). To prevent this, an optional timer may be introduced whereby a minimum amount of time must pass prior to switching active sessions in response to receiving a BFD message.

With the active BFD session selected and transmitting BFD messages 300, possible link failure may be detected when a returned BFD message is not received, or by some other internal detection mechanism (i.e., when the link fails internally). Note that a returned BFD message received on another link may also indicate a possible link failure, and may be responded to in the manner described above. In the event of a possible link failure, the active BFD session quickly selects another available bundle link upon which to begin transmitting the BFD messages. If the active BFD session hosts no other bundle links, another standby BFD session quickly assumes the role of the active BFD session, e.g., as notified by the previously active BFD session, or in response to the standby session's own selection algorithm (e.g., after learning of a possible link failure from the active BFD session). In this case, as mentioned above, the new active BFD session may notify the other BFD sessions of its state change (e.g., to ensure that there is no disagreement between active BFD sessions). Further, the LC 210 having previously active BFD session 212 may subsequently remove the previously active BFD session, since the LC no longer hosts any links of the bundle. Those skilled in the art will appreciate that an active link's becoming inactive may be treated in the same manner as a link failure, except the inactive link remains associated with the bundle (i.e., is not deleted).

Removal of an LC hosting an active BFD session for one or more bundle links is treated in a manner similar to that of a possible link failure. For instance, notification may generally be sent to other LCs hosting bundle links that an LC has been removed (e.g., online insertion and removal, OIR removal) in order to mark those removed links as deleted (i.e., no longer part of the bundle). If the LC was hosting the active BFD session, the remaining standby BFD sessions must select which among them is to become the new active BFD session. Typically, removal of an LC may be a "graceful" occurrence, where either the removed LC itself or the RP (control card) may send notification to remaining LCs either before removal or quickly thereafter. An LC failure, on the other hand, requires that the RP quickly inform the other LCs of the failure, else possibly causing false failure detection by the peer BFD node. This may occur more frequently, for example, when an LC is "brain-dead" (non-responsive), since the RP and/or other LCs may be unaware of its failure for a time longer than the high-speed BFD time-out period.

Once the active BFD session is switched to a new LC (e.g., in response to link failure, LC removal/failure, etc.), the active BFD session begins transmitting BFD messages over one of its available bundle links. In response, the received BFD messages no longer utilize the previous LC. If the received messages are received on the LC of the newly active BFD session, a symmetric path has been achieved. Otherwise, where the BFD messages are received at a standby BFD session, an asymmetric path results, which may be accommodated as described above (e.g., punting messages or switching the active session).

It is important that the peer BFD node also adapt quickly to a link/LC failure or removal. For instance, if the peer BFD node continues to send BFD messages to a failed LC, a false failure detection may result when the active BFD session does not receive a returned BFD message (or notification of a received BFD message at a standby BFD session). Also for example, if an LC fails, multiple bundle links may correspondingly become unavailable. Because timing is so important to BFD, it is highly desirable that an up-to-date topology of the link bundle exist at each of the BFD sessions. Otherwise, when switching from one link/LC to another link/LC, non-existent links/LCs may be attempted prior to finding one that exists and may be used appropriately. IIR module 249 (described above) may be used to convey the updated bundle information between peer BFD nodes as quickly as possible. Furthermore, because of the high-speed demands of BFD, prior to adjusting anything in accordance with the present invention described above (e.g., switching links or active BFD sessions) in response to a received IIR messages, the BFD node receiving the IIR message processes all information of the message, i.e., to ensure that multiple events (e.g., multiple links failing) are accounted for during calculations.

In accordance with the present invention, in the event no BFD sessions remain for the link bundle (e.g., no LCs host a bundle link) that may assume the active BFD session role, or no BFD sessions (active or standby) have received a returned BFD message for a configurable time-out period, the active BFD session (e.g., last remaining active BFD session) may determine that the link bundle has failed (i.e., is "down"). As those skilled in the art will understand, various bundle/node protection techniques may then be applied, routes may be updated, error messages may be generated, etc., in response to the rapid link bundle BFD failure detection.

Figure 4:
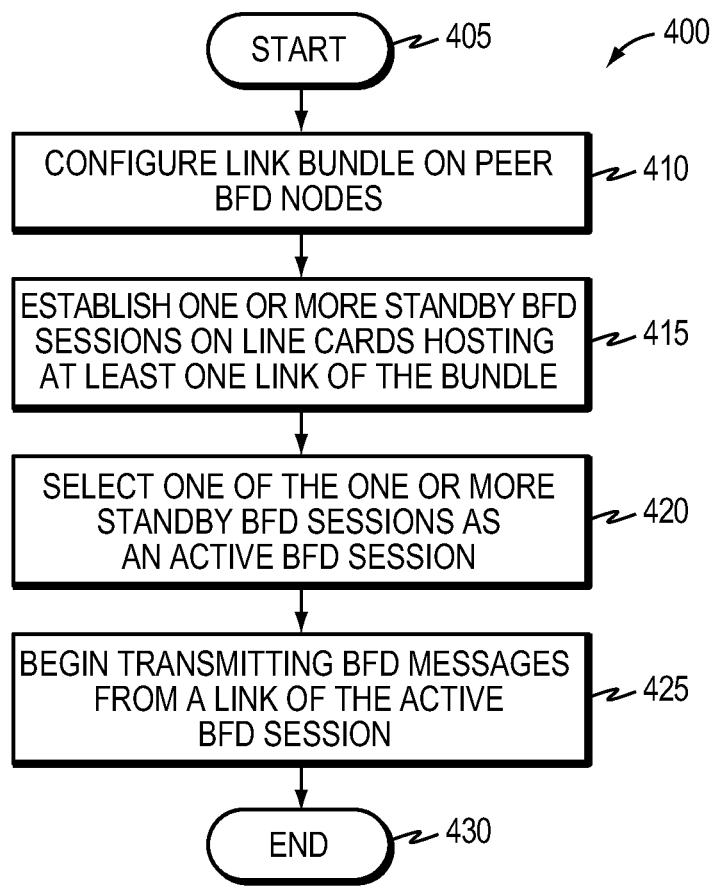
FIG. 4 is a flowchart illustrating a procedure for establishing BFD sessions for a bundle of links in accordance with the present invention.

FIG. 4 is a flowchart illustrating a procedure for establishing BFD sessions for a bundle of links in accordance with the present invention. The procedure 400 starts at step 405, and continues to step 410, where a link bundle is configured on peer BFD nodes, e.g., routers A and B. At step 415, one or more standby BFD sessions are established (e.g., by the RP or control card of router A) on LCs hosting at least one link of the bundle. Subsequently, one of the standby BFD sessions is selected as an active BFD session, such as, e.g., according to an algorithm as described above. Notably, the active BFD session may notify the standby BFD sessions that it is the active BFD session. At step 425, the active BFD session begins transmitting BFD messages from a particular link of the bundle, e.g., exchanging BFD initialization messages and BFD messages with the peer BFD router (e.g., router B). The procedure 400 to establish the BFD sessions then ends at step 430. Depending upon the configuration of the BFD node (router A), received BFD messages may either be punted (FIG. 5), or used to switch the active BFD session (FIG. 6), as described above.

Figure 5:
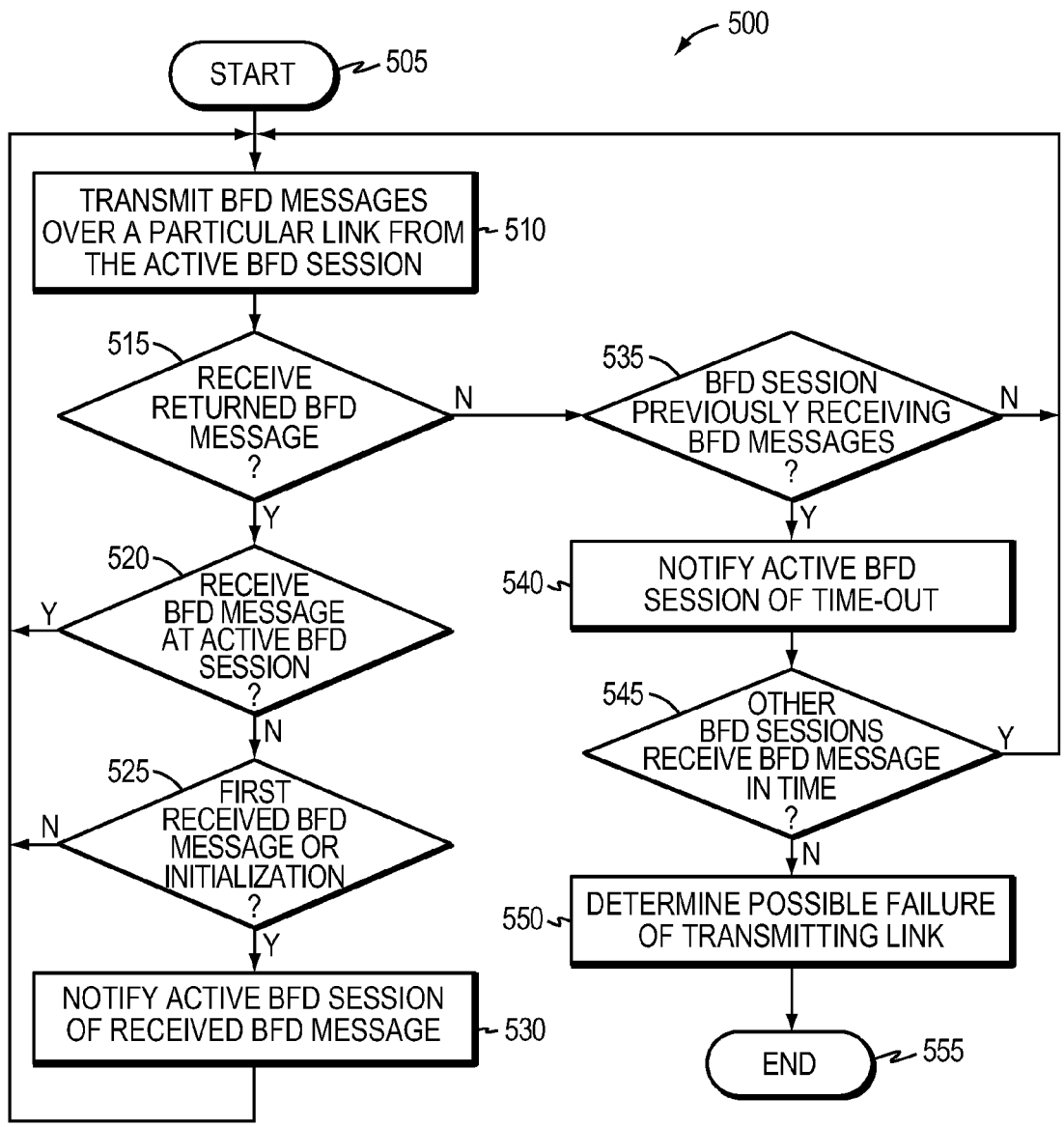
FIG. 5 is a flowchart illustrating a procedure for use with punting received BFD messages in accordance with the present invention.

FIG. 5 is a flowchart illustrating a procedure for use with punting received BFD messages in accordance with the present invention. The procedure 500 starts at step 505, and continues to step 510, where the active BFD session (e.g., of router A) transmits BFD messages from a particular link of the bundle. If a BFD message is returned from the peer BFD node (e.g., router B) at step 515 and is received at the active BFD session (e.g., on the transmitting link or other link) in step 520, then the procedure continues to transmit BFD messages from the active BFD session in step 510. In the event, however, a returned BFD message is not received at the active BFD session at step 520, i.e., it is received at another (standby) BFD session, the receiving standby BFD session may punt the BFD message to the active BFD session (not shown). As described above, an optimization to punting begins at step 525, where if the received BFD message at the standby BFD session is the first BFD message received at the standby BFD session (e.g., first ever or first after a time-out), or if the BFD message is part of a BFD initialization message exchange, the standby BFD session notifies the active BFD session of the received BFD message (or punts the message to the active BFD session, e.g., for initialization messages) at step 530. If at step 525 the received BFD message at the standby BFD session is not the first BFD message received at the standby BFD session, the procedure 500 continues to step 510 to transmit BFD messages from the active BFD session (i.e., the session has not timed-out).

Further to the optimization for punting BFD messages, if at step 515 a returned BFD message is not received, and the BFD session (e.g., a standby BFD session) had been previously receiving BFD messages at step 535, the BFD session notifies the active BFD session of the BFD time-out at step 540. Notably, the active BFD session may also determine that the BFD session has timed-out at step 540 if the active BFD session was previously receiving the BFD messages. Moreover, if at step 535 the BFD session was not previously receiving BFD messages, no action is taken by that BFD session, and the procedure 500 continues to transmit BFD messages from the active BFD session in step 510. After the time-out notification at step 540, if another BFD session has received a returned BFD message in time at step 545, the procedure 500 continues to transmit BFD messages from the active BFD session in step 510. Otherwise, no BFD sessions (active or standby) have received a returned BFD message at step 545, and the active BFD session may determine a possible failure of (at least) the transmitting link at step 550. The procedure 500 ends at step 555, e.g., to respond to the possible failed link as in FIG. 7 below.

Figure 6:
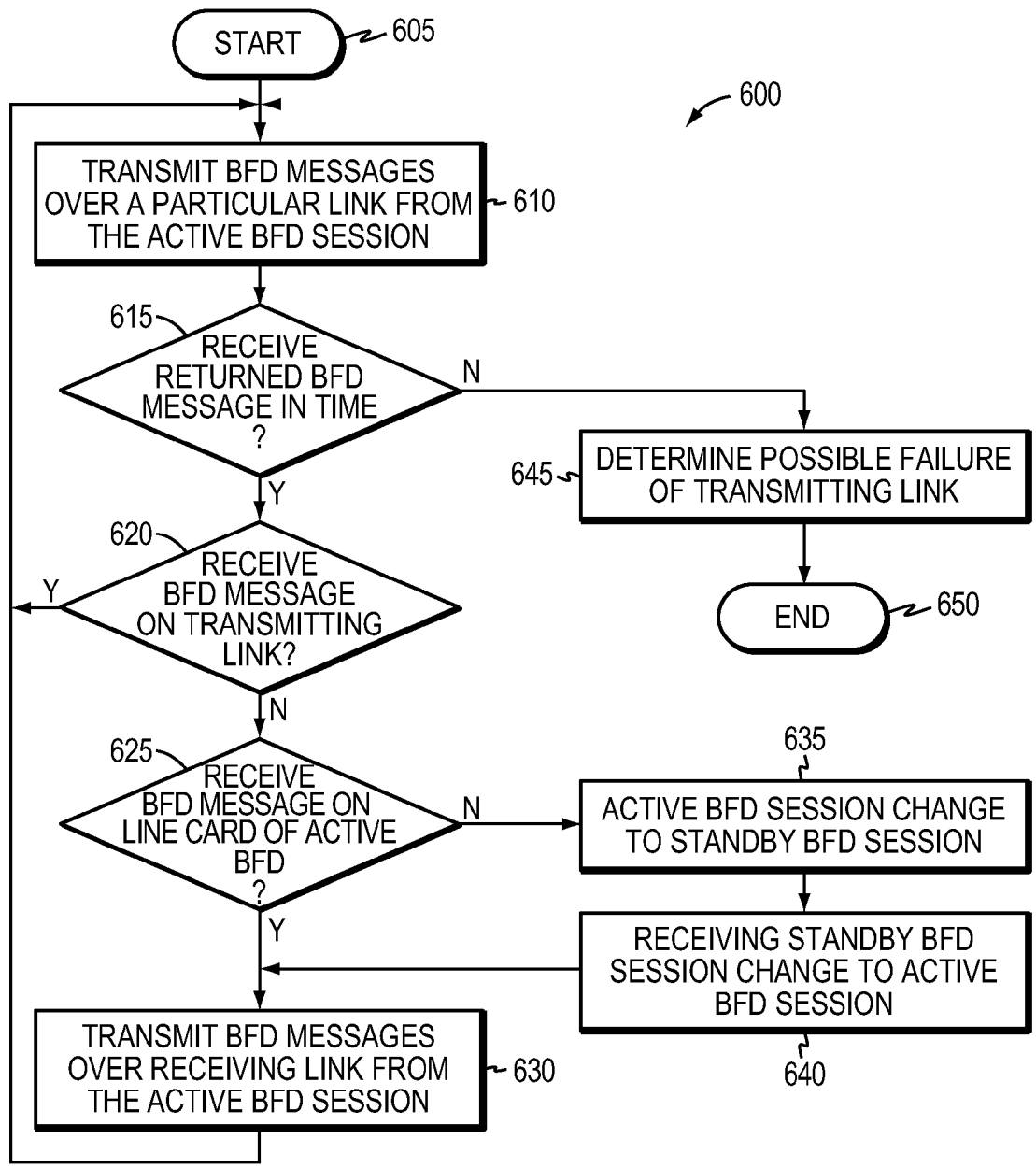
FIG. 6 is a flowchart illustrating a procedure for switching active BFD sessions based on received BFD messages in accordance with the present invention.

FIG. 6 is a flowchart illustrating a procedure for switching active BFD sessions based on received BFD messages in accordance with the present invention. The procedure 600 starts at step 605, and continues to step 610, where the active BFD session (e.g., of router A) transmits BFD messages from a particular link of the bundle. If a BFD messsage is returned from the peer BFD node (e.g., router B) at step 615 and is received on the transmitting link (i.e., at the active BFD session) in step 620, then the procedure continues to transmit BFD messages from the active BFD session in step 610. If at step 620 the BFD message is not received on the transmitting link, but is received on the LC of the active BFD session at step 625, then the active BFD session configures itself to transmit future BFD messages over the receiving link at step 630, and continues to transmit BFD messages in step 610. If, however, at step 625 the BFD messages are received on an LC of a standby BFD session, the active BFD session changes to a standby BFD session in step 635, and the receiving standby BFD session changes to the active BFD session in step 640. The new active BFD session configures itself to transmit future BFD messages over the receiving link at step 630, and continues to transmit BFD messages in step 610. If no BFD sessions (active or standby) have received a returned BFD message at step 615 in time, the active BFD session may determine a possible failure of (at least) the transmitting link at step 645. The procedure 600 ends at step 650, e.g., to respond to the possible failed link as in FIG. 7.

Figure 7:
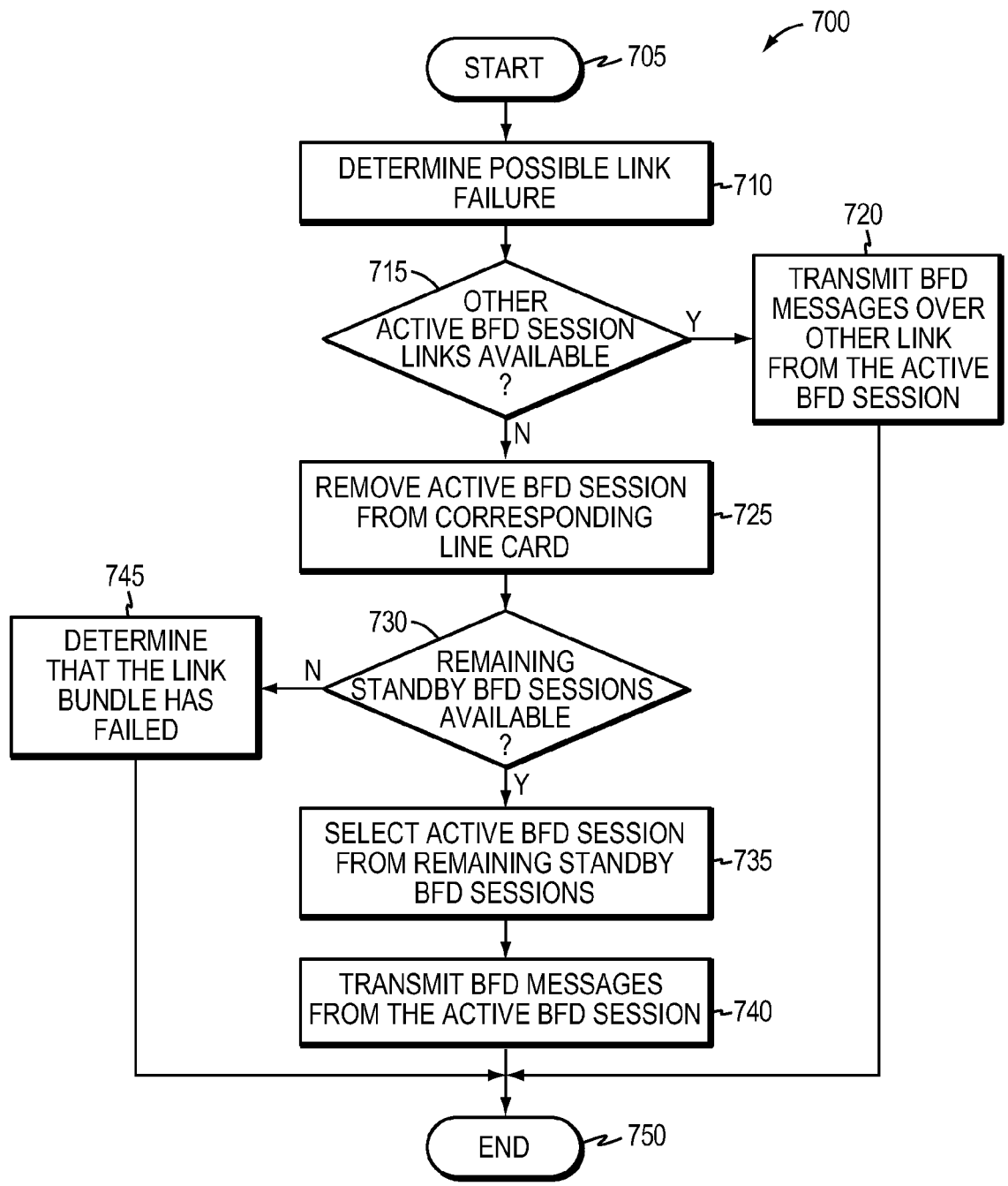
FIG. 7 is a flowchart illustrating a procedure for responding to a determined possible bundle link failure in accordance with the present invention.

FIG. 7 is a flowchart illustrating a procedure for responding to a determined possible bundle link failure in accordance with the present invention. The procedure 700 starts at step 705, and continues to step 710, where possible link failure is determined, e.g., as in FIG. 5 or FIG. 6 above (or by other internal link failure detection mechanisms). If at step 715 there are other links available at the active BFD session, the active BFD session configures itself to transmit future BFD messages over another available link at step 630, and the procedure 700 ends at step 750 (e.g., returning to FIG. 5 or FIG. 6 to transmit/process BFD messages). If at step 715 there are no other links available at the active BFD session, the corresponding LC removes the active BFD session (i.e., since the LC no longer hosts operational links of the bundle) at step 725. If there are remaining standby BFD sessions available at step 730, one of the standby sessions is selected as the new active BFD session in step 735. The new active BFD session then transmits BFD messages in step 740, and the procedure 700 ends at step 750 (e.g., returning to FIG. 5 or FIG. 6 to transmit/process BFD messages). On the other hand, if at step 730 there are no remaining standby BFD sessions, either the last active BFD session (prior to removal) or the master BFD session (e.g., on the RP) determines that the link bundle has failed in step 745, and the procedure 700 ends as step 750, e.g., for the BFD node to perform node protection techniques, etc.

Notably, those skilled in the art will understand that while the above description uses conventional BFD messages, the techniques described herein may also be applied to BFD Echo messages (returned to transmitting BFD node without being processed/used by peer node). As described above, however, the Echo messages may not return to the same LC (or BFD session) transmitting the messages, and needs to be dealt with accordingly.

Also, in an alternative embodiment of the present invention, the master BFD session executing on the RP (control card) may operate as the active BFD session, with at least one other standby BFD session executing on an LC hosting a bundle link. In this manner, RP failover may be treated just as an active BFD session failure/removal as described above. This alternative embodiment, however, still utilizes valuable RP resources and may not be optimal in terms of performance and/or scalability. However, in various situations and configurations as will be understood by those skilled in the art, this may provide a beneficial approach.

Advantageously, the novel technique efficiently and dynamically maintains BFD on a bundle of links in a computer network. By alternating between one or more standby BFD sessions on corresponding LCs as the active BFD session for a bundle of links, the novel technique provides greater performance, scalability, and reliability over a centralized BFD session. For instance, the BFD sessions on LCs may continue to operate regardless of a failure of a centralized process (e.g., a route processor, RP) managing the LCs. Also, by maintaining standby BFD sessions, more rapid handling of link and/or LC failure is possible, thus more aggressive BFD timeouts may be used. Further, the dynamic nature of the novel technique (e.g., selecting the active BFD session) alleviates the need for cumbersome manual configuration.

Figure 8:
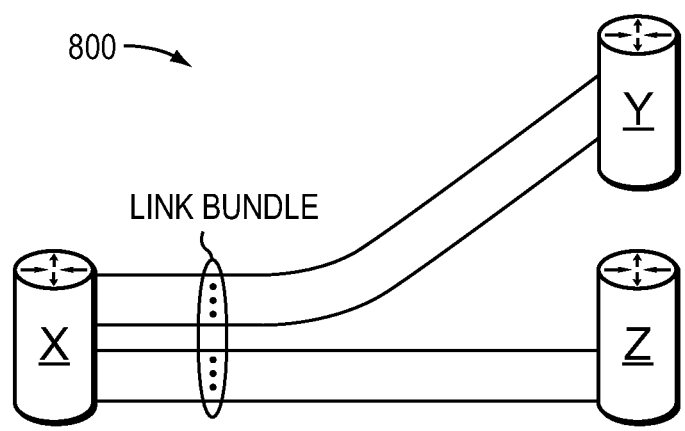
FIG. 8 is a schematic block diagram of an exemplary computer network having a link bundle between three nodes that may be advantageously used with the present invention.

While there has been shown and described an illustrative embodiment that efficiently and dynamically maintains BFD on a bundle of links in a computer network, it is to be understood that various other adaptations and modifications may be made within the spirit and scope of the present invention. For example, the invention has been shown and described herein for maintaining BFD on a bundle of links between two nodes. However, the invention in its broader sense is not so limited, and may, in fact, apply to link bundles between multiple nodes as well. FIG. 8 shows an exemplary computer network 800 having a link bundle between three nodes, where a node X has a link bundle to both nodes Y and Z as shown. In accordance with the present invention, line cards on both node Y and node Z must rapidly communicate the states of the standby and active BFD sessions as described above, such as via a communication protocol between Notifier processes 245 in both nodes. Those skilled in the art will understand that FIG. 8 is merely an example of link bundles between three or more nodes, and that other configurations may be used with the present invention.

Moreover, while the above description with reference to FIG. 1 mentions a switch (switch C) between BFD peers, a switch is not necessary for the present invention, and is merely an example. Those skilled in the art will understand that the present invention may be used for back-to-back nodes (routers) sharing an equal number of bundle links (i.e., a one-to-one link mapping). Those skilled in the art will also understand that while the examples given above refer to interfaces and links generally, both physical and virtual interfaces and/or links may be used in accordance with the present invention, including, for example, links for bundle VLANs, as described above. Further, while the above examples refer to routers as the peer BFD nodes, any network node capable of performing BFD services may be used in accordance with the present invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
configuring a plurality of links between a network node and another network node as a link bundle;
establishing, by the network node, one or more standby bidirectional forwarding detection (BFD) sessions, each standby BFD session associated with one or more links of the link bundle, wherein a standby state associated with the one or more standby BFD sessions is an internal state that is not signaled in a state field of transmitted BFD messages;
establishing, by the network node, an active BFD session, the active BFD session associated with one or more links of the link bundle;
in response to determining non-receipt of returned BFD messages for the active BFD session, selecting one or more new active BFD sessions from the one or more standby BFD sessions; and
in response to determining non-receipt of returned BFD messages for the one or more new active BFD sessions, determining that the link bundle has failed.

2. The method of claim 1, further comprising:
selecting the one or more links of the link bundle to be associated with the active BFD session based on activity on those one or more links.

3. The method of claim 1, further comprising:
selecting the one or more links of the link bundle to be associated with the active BFD session based on receipt of a returned BFD message on those one or more links.

4. The method of claim 1, further comprising
transmitting BFD messages from a transmitting link of the one or more links associated with the active BFD session.

5. The method of claim 4, wherein the one or more links associated with the active BFD session are a plurality of links associated with the active BFD session, and the method further comprises:
in response to non-receipt of returned BFD messages for the BFD messages transmitted on the transmitting link, transmitting BFD messages on one or more other links of the plurality of links associated with the active BFD session.

6. The method of claim 5, further comprising:
after non-receipt of returned BFD messages for the BFD messages transmitted on the one or more other links, selecting the one or more new active BFD sessions from the one or more standby BFD sessions.

7. The method of claim 1, further comprising:
after selecting one or more new active BFD sessions, transmitting BFD messages from a transmitting link of the link bundle associated with the one or more new active BFD sessions.

8. The method of claim 1, further comprising:
receiving a returned BFD message on a link associated with the one or more standby BFD sessions; and
forwarding the returned BFD message to the active BFD session.

9. The method of claim 1, further comprising:
in response to selecting the one or more new active BFD sessions, configuring the active BFD session as a standby BFD session.

10. The method of claim 1, wherein each of the one or more standby BFD sessions is a BFD session for which a BFD state machine is placed in a standby state.

11. An apparatus comprising:
one or more line cards coupled to a plurality of links; and
one or more processors configured to execute software processes, the software processes including a bidirectional forwarding detection (BFD) process that when executed is operable to:
configure the plurality of links as a link bundle,
establish one or more standby BFD sessions, each standby BFD session associated with one or more links of the link bundle, wherein a standby state associated with the one or more standby BFD sessions is an internal state that is not signaled in a state field of transmitted BFD messages
establish an active BFD session, the active BFD session associated with one or more links of the link bundle,
in response to determining non-receipt of returned BFD messages for the active BFD session, select one or more new active BFD sessions from the one or more standby BFD sessions, and
in response to determining non-receipt of returned BFD messages for the one or more new active BFD sessions, determine the link bundle has failed.

12. The apparatus of claim 11, wherein the BFD process when executed is further operable to:
select the one or more links of the link bundle to be associated with the active BFD session based on activity on those one or more links.

13. The apparatus of claim 11, wherein the BFD process when executed is further operable to:
select the one or more links of the link bundle to be associated with the active BFD session based on receipt of a returned BFD message on the respective one or more links.

14. The apparatus of claim 11, wherein the BFD process when executed is further operable to:
transmit BFD messages from a transmitting link of the one or more links associated with the active BFD session.

15. The apparatus of claim 11, wherein the BFD process when executed is further operable to:
after selection of the one or more new active BFD sessions, transmit BFD messages from a transmitting link of the link bundle associated with the one or more new active BFD sessions.

16. The apparatus of claim 11, wherein the BFD process when executed is further operable to:
when a returned BFD message is received on a link associated with a standby BFD session, forward the returned BFD message to the active BFD session.

17. The apparatus of claim 11, wherein the BFD process when executed is further operable to:
when the one or more new active BFD sessions are selected, configure the active BFD session as a standby BFD session.

18. A non-transitory computer readable medium having instructions stored thereon, the instructions when executed by one or more processors operable to:
configure a plurality of links as a link bundle;
establish one or more standby bidirectional forwarding detection (BFD) sessions, each standby BFD session associated with one or more links of the link bundle, wherein a standby state associated with the one or more standby BFD sessions is an internal state that is not signaled in a state field of transmitted BFD messages;

establish an active BFD session, the active BFD session associated with one or more links of the link bundle; and in response to a determination of non-receipt of returned BFD messages for the active BFD session, select one or more new active BFD sessions from the one or more standby BFD sessions.

19. The non-transitory computer readable medium of claim 18, wherein the instruction when executed by the one or more processes are further operable to:

in response to non-receipt of returned BFD messages for the one or more new active BFD sessions, determine that the link bundle has failed.

* * * * *